United States Patent [19]

Parnell et al.

[11] Patent Number: 5,041,316

[45] Date of Patent: Aug. 20, 1991

[54] MULTI-LAYER FILM STRUCTURE FOR PACKAGING AND BAGS MADE THEREFROM

[75] Inventors: Colin D. Parnell, Cellina Di Leggiuno; Tito A. Fornasiero, Rho Milan, both of Italy

[73] Assignee: W. R. Grace & Co.-Conn., Duncan, S.C.

[21] Appl. No.: 420,198

[22] Filed: Oct. 12, 1989

[30] Foreign Application Priority Data

Nov. 18, 1988 [GB] United Kingdom ............... 8827023

[51] Int. Cl.$^5$ .............................................. B32B 27/08
[52] U.S. Cl. .................................. 428/35.4; 428/349; 428/516; 428/518; 428/520
[58] Field of Search ..................... 428/35.4, 349, 516, 428/518, 520

[56] References Cited

U.S. PATENT DOCUMENTS

| | | | |
|---|---|---|---|
| 4,640,856 | 2/1987 | Ferguson et al. | 428/36 |
| 4,837,084 | 6/1989 | Warren | 428/349 |
| 4,863,769 | 9/1989 | Lustig et al. | 428/34.9 |
| 4,863,784 | 9/1989 | Lustig et al. | 428/218 |
| 4,976,898 | 12/1990 | Lustig et al. | 264/22 |

FOREIGN PATENT DOCUMENTS 0217252 4/1987 European Pat. Off. .
0292894 11/1988 European Pat. Off. .

*Primary Examiner*—James J. Seidleck
*Attorney, Agent, or Firm*—John J. Toney; William D. Lee, Jr.; Jennifer L. Skord

[57] ABSTRACT

A multi-layer thermoplastic shrinkable film with improved processing properties comprising at least a heat sealing VLDPE layer, a core oxygen barrier layer and an outer thermoplastic layer, and also comprising interposed between the barrier and the outer thermoplastic layer a further intermediate VLDPE layer.

14 Claims, No Drawings

MULTI-LAYER FILM STRUCTURE FOR PACKAGING AND BAGS MADE THEREFROM

This invention relates to flexible, thermoplastic multi-layer shrinkable film structures useful in packaging and to bags or pouches made therefrom. In particular, the invention relates to such film structures having improved processing properties.

Preparation of multi-layer films is nowadays a widespread technique used to provide packaging films having a combination of desirable properties such as good heat sealability and good seal resistance, satisfactory heat shrinking properties, and sometimes good oxygen barrier properties, when the film is to be used in packaging and preserving perishable foodstuffs.

Usually, such multi-layer films comprise at least a heat sealing layer arranged innermost in use, a core oxygen barrier layer and an outer thermoplastic layer. One or more additional thermoplastic layers can be present, which together with the outer thermoplastic layer perform generally as structural layers conferring upon the film mechanical strength and resistance to abuse during use.

From EP-A-217 252, packaging films are known comprising at least a heat sealing layer of very low density polyethylene (VLDPE), a core oxygen barrier layer and one or more thermoplastic polymeric layers, in particular of olefin homo- or co-polymers. These films have good shrink characteristics in terms of high percentage shrink and high tolerated shrink temperatures.

From U.S. Pat. No. 4,640,856 multilayer films are known comprising, in addition to a heat sealing VLDPE layer and an oxygen barrier layer, at least a further outer VLDPE layer.

While the films disclosed in EPA-217 252 were shown to have very advantageous shrink characteristics, they also exhibited certain drawbacks related to their processing properties. In particular, when produced according to a usual practice, in the form of tubular film structures, they showed curl formation leading to certain problems in the manufacturing of side sealed bags. The curling effect noted with this prior art films could be possibly due to the following fact. Surprisingly, VLDPE, while having a melting point of about 120°–125° C., can be oriented out of hot water at 90°–95° C. Most other polyolefins (such as EVA) are oriented at a temperature much closer to their melting point, i.e. around 5° C. below M.P.. A multi-layer film comprising both VLDPE and another polyolefin layer and which is oriented out of hot water shows a "curling" effect which is thought to occur because the "orientation energy" of the different materials is "unbalanced". The curling effect manifests itself if for example the tubing is cut transversely or longitudinally, by showing a tendency to curl inwards at the point of cutting.

On the other hand, films produced according to U.S. Pat. No. 4,640,856 and having an outer VLDPE thermoplastic layer showed some processing difficulties due mostly to a certain tendency to stick to the jaws of the sealing equipment used at the point of packaging (i.e. by the customer), particularly when packaging products of low unit weight (e.g. less than 1 kg).

It is an object of the present invention to provide a multi-layer film structure having improved processing properties, and in particular such film structures which are curl-free allowing straightforward production of side-sealed bags.

It is a further object of the present invention to provide curl-free multi-layer films which do not reveal any tendency to stick to the jaws of the heat sealing equipment at the point of packaging and can thus easily be used on high speed automatic packaging equipment.

It is still another object of the present invention to provide multi-layer films and bags which have a combination of good processing and heat shrink properties.

The above and still further objects are achieved by the present invention which provides a thermoplastic multi-layer packaging film with improved processing properties comprising at least a heat sealing layer of very low density polyethylene (VLDPE), a core oxygen barrier layer and an outer thermoplastic layer, characterized in that said film further comprises an intermediate layer of VLDPE interposed between said oxygen barrier and said outer thermoplastic layer.

The VLDPE polymer useful in the multi-layer film of the present invention is similar to that disclosed in the above mentioned EPA-217 252, i.e. it comprises copolymers of ethylene with about 10 to 25% by weight of an alpha-olefin having 4 to 8 carbon atoms, such copolymers having a very low density of below 920 kg/m$^3$.

The VLDPE layers useful in the present invention can comprise either a VLDPE polymer as defined above, or a blend thereof with up to 50% by weight of the respective layer, of a further polymer compatible with VLDPE. Such further polymer can be selected from the group comprising linear low density polyethylene (LLDPE), linear high density polyethylene (LHDPE), low density polyethylene (LDPE), ethylene/vinyl acetate (EVA) copolymer, acid modified EVA, polypropylene, ethylene/propylene copolymers, ionomers and ethylene/C$_1$–C$_8$-alkyl acrylate copolymers.

Such VLDPE polymers have been also disclosed in EPA-120 503 or in Plastics Technology, September 1984, pg. 113 or October 1984, pg. 13.

The multi-layer film according to the invention comprises, in a preferred embodiment thereof, in addition to the basic layers mentioned above, at least one additional thermoplastic layer arranged interposed between the heat sealing layer and the barrier layer.

The thermoplastic layer(s) included in the film of the invention can be made of polyethylenes such as linear low density polyethylene (LLDPE) with a density above 920 kg/m$^3$, linear high density polyethylene (LHDPE), and ethylene copolymers such as ethylene/vinyl acetate (EVA), ethylene/alkylacrylate copolymers wherein the alkyl moiety has 1 to 8 carbon atoms, for example ethylene/butyl acrylate (EBA), ethylene/acrylic acid (EAA) copolymers or ionomeric polymers.

The outer and said at least one additional thermoplastic layer may be identical or different and are preferably selected from EVA copolymers with a vinyl acetate content of 4 to 30% by weight of the copolymer.

The oxygen barrier layer useful in the present invention can comprise polyvinylidene chloride (PVDC) or an ethylene/vinyl alcohol (EVOH) copolymer, but preferably PVDC.

It has been found that with the preferred barrier layer of PVDC the bond between PVDC and the intermediate VLDPE layer is surprisingly good (on average over 40 g/25 mm), and consistently better than that between PVDC/EVA in conventional multi-layer films, where the vinyl acetate content in EVA is nominally of 8 to 10% by weight.

Thus, according to a preferred embodiment thereof, the film of the invention comprises the following layers: a VLDPE heat sealant/a thermoplastic layer/a PVDC barrier layer/a VLDPE intermediate layer/an outer thermoplastic layer.

According to a further embodiment of the inventive film it comprises a VLDPE sealant layer/a thermoplastic layer/a conventional adhesive layer/an EVOH barrier layer/an ahesive layer/a VLDPE intermediate layer/an outer thermoplastic layer. Alternatively a blend of VLDPE and a polymer which has a good bond to EVOH may be used between EVOH and the outer thermoplastic layer.

The polymer used as an adhesive layer or in a blend with VLDPE in order to confer a good bond to EVOH can comprise a modified copolymer obtained by modifying a copolymer of ethylene with a vinyl carboxylate (e.g. vinyl acetate) or an acrylic ester (such as EVA or EAA copolymers) with an ethylenically unsaturated carboxylic acid or an acid anhydride thereof or a polymeric material obtained by further modifying the modified copolymer with a metal compound, as is known.

The multi-layer film according to the invention can be prepared by conventional coextrusion techniques. According to one embodiment of the invention the ethylene copolymer forming the sealing layer may be cross-linked by chemical or physical means in order to improve its shrink characteristics and mechanical properties. However such cross-linking is not necessary since very satisfactory packaging film is also obtained without cross-linking. If cross-linking is carried out by some physical means such as high-energy electrons, and PVDC is used as the oxygen barrier layer, the cross-linking should take place prior to the lamination of the core layer to the sealing layer (or to the sealing and other additional interposed thermoplastic layers) since PVDC may suffer when exposed to high energy electrons. The entire multi-layer film may be cross-linked if instead of PVDC an EVOH barrier layer is used.

The films, as coextruded or laminated, are usually oriented in longitudinal and transversal direction to obtain the desired shrink properties. If a tubular film is produced by extrusion the orientation may be effected using the known air bubble method and further stretching the film by pulling. Alternatively, orientation may be achieved by deep drawing of a planar film.

The film so obtained can be used for packaging as such or bags can be prepared therefrom by cutting suitable lengths and sealing them at least along two portions thereof arranged with the respective VLDPE heat sealing layers facing each other.

The following examples set forth in the Table given hereinbelow show various multi-layer film structures according to the present invention and their processing performances in comparison with two reference films prepared according to the prior art.

EXAMPLES

The film structures of the examples are produced by extruding onto a respective preformed mult-ply substrate comprising the heat sealant and the additional thermoplastic layer, and subjected to preliminary cross-linking, the respective multi-layer coating and then orienting them biaxially to obtain the heat shrinkable tubing.

TABLE OF EXAMPLES AND COMPARATIVE EXAMPLES

| | SEAL LAYER | ADDITIONAL THERMOPLASTIC LAYER(S) | BARRIER LAYER | OTHER LAYER(S) |
|---|---|---|---|---|
| REFERENCE STRUCTURE 1 | VLDPE | $EVA_1$ | PVDC | |
| REFERENCE STRUCTURE 2 | VLDPE | $EVA_1$ | PVDC | |
| EXAMPLE 1 | VLDPE | $EVA_1$ | PVDC | VLDPE |
| EXAMPLE 2 | VLDPE | $EVA_1/EVA_2$ | PVDC | VLDPE |
| EXAMPLE 3 | VLDPE | $EVA_2$/IONOMER/$EVA_2$ | PVDC | VLDPE |
| EXAMPLE 4 | VLDPE | EBA | PVDC | VLDPE |
| REFERENCE STRUCTURE 3 | VLDPE + EBA | $EVA_1$ | PVDC | |
| REFERENCE STRUCTURE 4 | VLDPE + EBA | $EVA_1$ | PVDC | |
| EXAMPLE 5 | VLDPE + EBA | $EVA_1$ | PVDC | VLDPE |
| EXAMPLE 6 | VLDPE + EBA | $EVA_1/EVA_2$ | PVDC | VLDPE |
| EXMAPLE 7 | VLDPE + EBA | $EVA_2$/SURLYN/$EVA_2$ | PVDC | VLDPE |
| EXAMPLE 8 | VLDPE + EBA | EBA | PVDC | VLDPE |
| EXAMPLE 9 | VLDPE + EVA | $EVA_1$/ADHESIVE | EVOH | VLDPE + ADHESIVE |

| | OUTER LAYER | CURL | SHRINK % LD | SHRINK % TD | STICKING TO CUSTOMER EQUIPMENT |
|---|---|---|---|---|---|
| REFERENCE STRUCTURE 1 | $EVA_1$ | YES | 32 | 44 | NO |
| REFERENCE STRUCTURE 2 | VLDPE | NO | 30 | 42 | YES |
| EXAMPLE 1 | $EVA_1$ | NO | 30 | 42 | NO |
| EXAMPLE 2 | $EVA_1$ | NO | 35 | 48 | NO |
| EXAMPLE 3 | $EVA_1$ | NO | 35 | 48 | NO |
| EXAMPLE 4 | $EVA_1$ | NO | 33 | 45 | NO |
| REFERENCE STRUCTURE 3 | $EVA_1$ | YES | 32 | 44 | NO |
| REFERENCE STRUCTURE 4 | VLDPE | NO | 30 | 42 | YES |
| EXAMPLE 5 | $EVA_1$ | NO | 30 | 42 | NO |
| EXAMPLE 6 | $EVA_1$ | NO | 35 | 48 | NO |
| EXMAPLE 7 | $EVA_1$ | NO | 35 | 48 | NO |
| EXAMPLE 8 | $EVA_1$ | NO | 33 | 45 | NO |

-continued
TABLE OF EXAMPLES AND COMPARATIVE EXAMPLES

| | | | | | |
|---|---|---|---|---|---|
| EXAMPLE 9 | EVA$_1$ | NO | 22 | 30 | NO |

NOTES
LD: Longitudinal direction
TD: Transverse direction
EVA$_1$: E/9% VA
EVA$_2$: E/18% VA
EBA: E/7% Butyl acrylate As it clearly appears from the above examples the multi-layer film according to the present invention achieves a notable improvement of processing characteristics in that it avoids both curl formation and sticking problems during manufacturing and during heat sealing, the latter step being carried out on the customer's sealing and packaging equipment. Furthermore, the bond between the PVDC barrier and intermediate VLDPE layers results to be surprisingly good, thus improving the abuse strength and delamination resistance of the whole multi-layer structure.

We claim:

1. A thermoplastic multi-layer packaging film with improved processing properties comprising at least a heat sealing layer of very low density polyethylene (VLDPE), a core oxygen barrier layer, and an outer thermoplastic layer, characterized in that said film further comprises an intermediate layer of VLDPE interposed between said oxygen barrier and said outer thermoplastic layer, and comprises at least one additional thermoplastic layer arranged between said heat sealing and said barrier layer.

2. The film of claim 1 wherein said outer thermoplastic layer and said at least one additional thermoplastic layer are independently selected from linear polyethylenes of low and high density, ethylene copolymers comprising ethylene/vinyl acetate (EVA) and ethylene/alkyl acrylate copolymers wherein the alkyl group has 1 to 8 carbon atoms, ethylene/acrylic acid copolymers, and ionomeric polymers.

3. The film of claim 1 wherein said oxygen barrier layer is selected from polyvinylidene chloride (PVDC) and ethylene/vinyl alcohol copolymers (EVOH).

4. The film of claim 3 wherein the ethylene alkyl acrylate copolymer is ethylene butyl acrylate (EBA).

5. The film of claim 4 wherein said oxygen barrier layer is PVDC.

6. The film of claim 1 wherein said outer thermoplastic layer and said at least one additional thermoplastic layer are each independently selected from ethylene/vinyl acetate copolymers having a vinyl acetate content of 4 to 30% by weight.

7. The film of claim 1 comprising at least a VLDPE heat sealing layer, a thermoplastic layer, a core oxygen barrier PVDC layer, an intermediate VLDPE layer, and an outer EVA layer.

8. The film of claim 1 comprising at least a VLDPE heat sealing layer, a core oxygen barrier EVOH layer, an intermediate VLDPE layer, an outer EVA layer, and adhesive layers interposed between said EVOH layer and the layers adjacent thereto.

9. The film of claim 1 comprising at least a VLDPE heat sealant, an adhesive layer, a core oxygen barrier EVOH layer, an intermediate layer comprising a blend of VLDPE and an adhesive polymer, and an outer EVA layer.

10. The film of claim 9 wherein said adhesive polymer and said adhesive layer comprise a modified copolymer obtained by modifying a copolymer of ethylene and a vinyl carboxylate or an acrylic ester with an ethylenically unsaturated carboxylic acid or an acid anhydride thereof or by further modifying said modified copolymer with a metal compound.

11. The film of claim 1 wherein the VLDPE layers comprise a VLDPE polymer selected from ethylene alpha-olefin copolymers comprising 10 to 25% by weight of at least one alpha-olefin having 4 to 8 carbon atoms per molecule, said copolymers having a density of below 0.920 kg/m$^3$.

12. The film of claim 11 wherein said VLDPE layers comprise a blend of said VLDPE polymer with up to 50% by weight, based on said layer, of a further polymer compatible with the VLDPE polymer which is selected from linear low density polyethylene (LLDPE), linear high density polyethylene (LHDPE), low density polyethylene (LDPE), ethylene/vinyl acetate (EVA) copolymers, acid modified EVA, polypropylene, ethylene/propylene copolymers, ionomers, and ethylene/C$_1$–C$_8$ alkyl acrylate copolymers.

13. The film of claim 1 which has been biaxially stretched whereby rendering it heat-shrinkable.

14. A bag formed from the film of any one of claims 1 to 13 by sealing together at least two portions thereof arranged with said heat sealing VLDPE layers facing eachother.

* * * * *